(12) United States Patent
Okazaki (10) Patent No.: US 8,449,645 B2
(45) Date of Patent: May 28, 2013

(54) CERAMIC HONEYCOMB STRUCTURE AND ITS PRODUCTION METHOD

(75) Inventor: Shunji Okazaki, Fukuoka (JP)

(73) Assignee: Hitachi Metals, Ltd., Tokyo (JP)

( * ) Notice: Subject to any disclaimer, the term of this patent is extended or adjusted under 35 U.S.C. 154(b) by 74 days.

(21) Appl. No.: 13/262,167

(22) PCT Filed: Mar. 31, 2010

(86) PCT No.: PCT/JP2010/055939
§ 371 (c)(1),
(2), (4) Date: Sep. 29, 2011

(87) PCT Pub. No.: WO2010/114062
PCT Pub. Date: Oct. 7, 2010

(65) Prior Publication Data
US 2012/0023879 A1  Feb. 2, 2012

(30) Foreign Application Priority Data
Mar. 31, 2009  (JP) .................................. 2009-087872

(51) Int. Cl.
*B01D 39/06*  (2006.01)

(52) U.S. Cl.
USPC ............................. 55/523; 264/628; 264/630

(58) Field of Classification Search
USPC  55/522–524; 422/169–172, 177–182; 60/297
See application file for complete search history.

(56) References Cited

U.S. PATENT DOCUMENTS

| 7,754,160 | B2 * | 7/2010 | Miyairi et al. ................ 422/180 |
| 2003/0041574 | A1 * | 3/2003 | Noguchi et al. ................ 55/523 |
| 2007/0166564 | A1 | 7/2007 | Morimoto et al. |
| 2010/0310819 | A1 * | 12/2010 | Suwabe et al. ................ 428/116 |
| 2011/0135873 | A1 * | 6/2011 | Okazaki et al. ............... 428/116 |

FOREIGN PATENT DOCUMENTS

| JP | 60-2270 B | 1/1985 |
| JP | 02-229760 A | 9/1990 |
| JP | 2002-530262 A | 9/2002 |
| WO | 00/30995 A1 | 6/2000 |
| WO | 2005/094967 A1 | 10/2005 |

(Continued)

OTHER PUBLICATIONS

International Search Report of PCT/JP2010/055939, dated Jul. 13, 2010.

*Primary Examiner* — Duane Smith
*Assistant Examiner* — Amber Orlando
(74) *Attorney, Agent, or Firm* — Sughrue Mion, PLLC (57) ABSTRACT

A ceramic honeycomb structure having a large number of flow paths defined by porous cell walls; said porous cell walls being composed of cordierite crystals, mullite crystals, corundum crystals and/or spinel crystals; the percentage of the X-ray diffraction intensity of the cordierite crystals being 72% or more and less than 85%, the percentage of the X-ray diffraction intensity of the mullite crystals being 15-25%, and the percentage of the total X-ray diffraction intensity of the corundum crystals and the spinel crystals being 5% or less, per the total X-ray diffraction intensity of these crystals; said porous cell walls having a true density of 2.55-2.70 $g/cm^3$, a mean pore diameter of 10-20 μm, and a porosity of 50-65%; the volume of pores having diameters exceeding 50 μm being 8-25% of the total pore volume, the volume of pores having diameters of less than 10 μm being 16-25% of the total pore volume, and the pore diameter distribution deviation σ being 0.5 or less.

5 Claims, 3 Drawing Sheets

FOREIGN PATENT DOCUMENTS

| | | |
|---|---|---|
| WO | 2008/005249 A2 | 1/2008 |
| WO | 2008/005291 A1 | 1/2008 |
| WO | 2008/027219 A2 | 3/2008 |

* cited by examiner

CERAMIC HONEYCOMB STRUCTURE AND ITS PRODUCTION METHOD

CROSS REFERENCE TO RELATED APPLICATION

This application is a National Stage of International Application No. PCT/JP2010/055939 filed Mar. 31, 2010, claiming priority based on Japanese Patent Application No. 2009-087872, filed Mar. 31, 2009, the contents of all of which are incorporated herein by reference in their entirety.

FIELD OF THE INVENTION

The present invention relates to a ceramic honeycomb structure used for ceramic honeycomb filters for removing particulate matter from an exhaust gas discharged from diesel engines, and its production method.

BACKGROUND OF THE INVENTION

Figure 1:
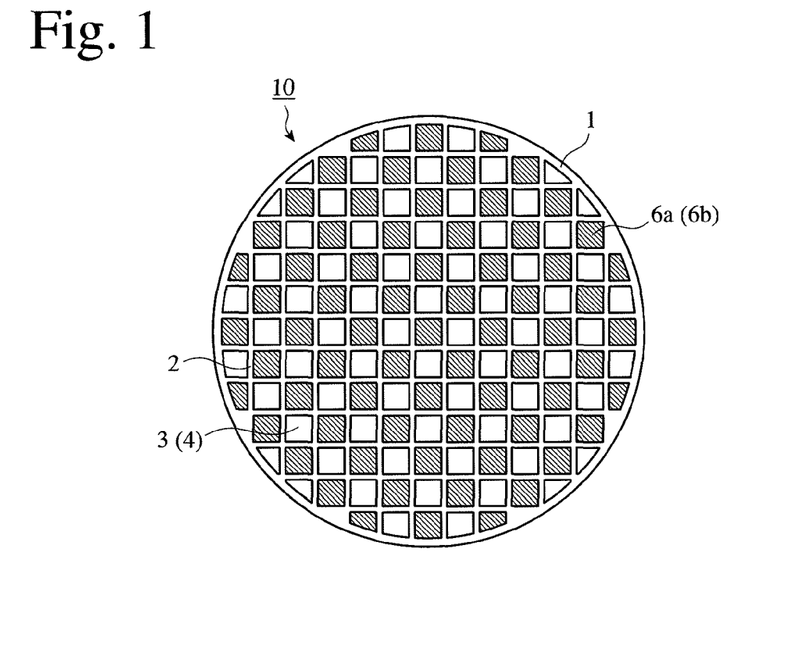
FIG. 1 is a schematic cross-sectional view showing one example of honeycomb filters perpendicularly to its flow paths.
Figure 2:
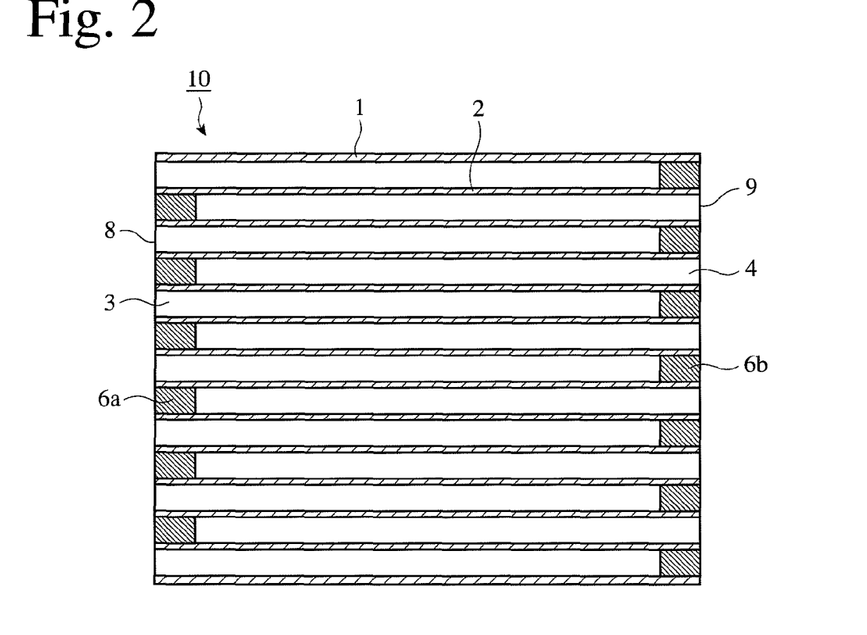
FIG. 2 is a schematic cross-sectional view showing one example of honeycomb filters in parallel to its flow paths.

Exhaust gases discharged from diesel engines contain particulate matter (PM) comprising as main components carbonaceous soot and soluble organic fractions (SOFs) comprising high-boiling-point hydrocarbon components, and are likely to adversely affect humans and environment when discharged to the air in large amounts. Accordingly, a ceramic honeycomb filter (hereinafter referred to simply as "honeycomb filter") for capturing PM has conventionally been attached to an exhaust pipe from the diesel engine. FIGS. 1 and 2 show one example of honeycomb filters for cleaning an exhaust gas by capturing PM. The honeycomb filter 10 comprises a ceramic honeycomb structure (hereinafter referred to simply as "honeycomb structure") comprising porous cell walls 2 forming a large number of outlet-sealed flow paths 3 and inlet-sealed flow paths 4 and a peripheral wall 1, and upstream-side plugs 6a and downstream-side plugs 6b alternately sealing an exhaust-gas-inlet-side end surface 8 and an exhaust-gas-outlet-side end surface 9 of the outlet-sealed flow paths 3 and the inlet-sealed flow paths 4 in a checkerboard pattern.

This honeycomb filter is required to capture particulate matter contained in the exhaust gas with high efficiency during use, with low pressure loss exerting little load to engines. However, because the more particulate matter captured, the more cell wall pores clogged, resulting in higher pressure loss, the captured particulate matter should be burned off to regenerate the honeycomb filter. Thus, the honeycomb filter is required to have high heat resistance and heat shock resistance, because it is repeatedly exposed to high temperatures while burning particulate matter. Because the burning of more accumulated particulate matter exposes the honeycomb filter to extremely high temperatures, making it likely to partially melt cell walls, the melt-down resistance of the honeycomb filter should be taken into consideration.

Though cordierite is generally used as a material for porous cell walls, cell walls made of cordierite have as low a thermal expansion coefficient as about $10 \times 10^{-7}/°C$. Thus, despite excellent heat shock resistance that makes cracking due to heat shock less likely, they are likely to be partially molten when the honeycomb filter is exposed to extremely high temperatures by burning the highly accumulated particulate matter. To improve resistance to melting, it is effective to provide porous cell walls with low porosity for higher thermal capacity, and to use more heat-resistant materials such as silicon carbide, aluminum titanate, etc. However, silicon carbide has a large thermal expansion coefficient and is extremely expensive. Aluminum titanate is decomposed to $TiO_2$ and $Al_2O_3$ in a temperature range of 1000-1200° C.

As a cordierite ceramic honeycomb having heat resistance improved while keeping heat shock resistance, JP 60-2270 B discloses a cordierite ceramic honeycomb made of cordierite as a main component, and having a crystal phase containing 2-15% of at least one selected from the group consisting of spinel, mullite and corundum, describing that this ceramic honeycomb has a thermal expansion coefficient of $22 \times 10^{-7}/°C$. or less in a temperature range from 25° C. to 1000° C., a softening shrinkage ratio of 10% or less at 1450° C., and a mean pore diameter of 3-30 µm. As a method for producing this cordierite ceramic honeycomb, JP 60-2270 B discloses a method of preparing a batch comprising starting material powders having a chemical composition comprising 42-52% of silica, 34-48% of alumina and 10-18% and magnesia, and at least one crystal selected from spinel, mullite and alumina, plasticizing and forming it to a honeycomb shape, drying and sintering it.

However, because the ceramic honeycomb described in JP 60-2270 B is used for carriers for exhaust-gas-cleaning catalysts for automobiles, it is not produced by such a method as using, for instance, a pore-forming material for high porosity. Accordingly, it has low porosity, and does not have sufficient pressure loss characteristics necessary for ceramic honeycomb filters.

JP 2002-530262 A discloses a ceramic product comprising a crystal phase comprising 65-95% by weight of a first cordierite crystal phase, and 5-35% by weight of a second crystal phase selected from mullite, magnesium aluminate, spinel and sapphirine, having a composition comprising 32-51% by weight of $SiO_2$, 35-49% by weight of $Al_2O_3$ and 7-16% by weight of MgO, and porosity of about 20% or more and a thermal expansion coefficient of about $15.0 \times 10^{-7}/°C$. or less in a temperature range of 25° C. to 1000° C.

The ceramic honeycomb described in JP 2002-530262 A is also used as carriers for catalysts for cleaning exhaust gases of automobiles, having porosity of substantially about 25-40%, but not having sufficient pressure loss characteristics necessary for ceramic honeycomb filters.

Though it would be possible to provide the ceramic honeycomb filters described in JP 60-2270 B and JP 2002-530262 A with improved pressure loss characteristics by using, for instance, pore-forming materials, etc. for higher porosity, the higher porosity would result in lower thermal capacity, providing the honeycomb filters with insufficient resistance (heat shock resistance and heat resistance) when repeatedly exposed to rapid temperature elevation and high burning temperatures during filter regeneration, so that the honeycomb filters may be molten. In addition, sufficient particulate-matter-capturing performance and strength, characteristics contradictory to low pressure loss, cannot be achieved.

OBJECT OF THE INVENTION

Accordingly, an object of the present invention is to provide a ceramic honeycomb filter having excellent heat shock resistance and heat resistance as well as low pressure loss, good capturing efficiency and high strength.

DISCLOSURE OF THE INVENTION

As a result of intense research in view of the above object, the inventors have found that the above object can be achieved by properly precipitating mullite in the cordierite, and properly controlling the pore diameter distribution of cell walls. The present invention has been completed based on such finding.

Thus, the ceramic honeycomb structure of the present invention has a large number of flow paths defined by porous cell walls; said porous cell walls being composed of cordierite crystals, mullite crystals, corundum crystals and/or spinel crystals; the percentage of the X-ray diffraction intensity of the cordierite crystals being 72% or more and less than 85%, the percentage of the X-ray diffraction intensity of the mullite crystals being 15-25%, and the percentage of the total X-ray diffraction intensity of the corundum crystals and the spinel crystals being 5% or less, per the total X-ray diffraction intensity of these crystals, wherein the X-ray diffraction intensity of each crystal is the intensity of a main peak converted from each X-ray diffraction intensity of a (102) plane of cordierite, a (110) plane of mullite, a (104) plane of corundum and a (220) plane of spinel;

said porous cell walls having a true density of 2.55-2.70 g/cm$^3$, a mean pore diameter of 10-20 μm, and a porosity of 50-65%, the volume of pores having diameters exceeding 50 μm being 8-25% of the total pore volume;

the volume of pores having diameters of less than 10 μm being 16-25% of the total pore volume, and the pore diameter distribution deviation σ[=log($D_{20}$)−log($D_{80}$)] being 0.5 or less, wherein $D_{20}$ represents a pore diameter (μm) at a pore volume corresponding to 20% of the total pore volume, and $D_{80}$ similarly represents a pore diameter (μm) at a pore volume corresponding to 80% of the total pore volume, on a curve showing the relation between a pore diameter and a cumulative pore volume obtained by accumulating a pore volume from the maximum pore diameter to a particular pore diameter, and $D_{80}$<$D_{20}$.

The thermal expansion coefficient of said ceramic honeycomb structure is preferably 20×10$^{-7}$ or less between 20° C. and 800° C.

Said ceramic honeycomb structure preferably has thermal conductivity of 0.17 W/mK or more.

After a sample (60 mm×40 mm× cell wall thickness) cut out of said ceramic honeycomb structure along the cell walls is kept at 1650° C. for 30 seconds, 75% or more by area of the sample preferably remains without melting.

The method of the present invention for producing a ceramic honeycomb structure having a large number of flow paths defined by porous cell walls; said porous cell walls being composed of cordierite crystals, mullite crystals, corundum crystals and/or spinel crystals; the percentage of the X-ray diffraction intensity of the cordierite crystals being 72% or more and less than 85%, the percentage of the X-ray diffraction intensity of the mullite crystals being 15-25%, and the percentage of the total X-ray diffraction intensity of the corundum crystals and the spinel crystals being 5% or less, per the total X-ray diffraction intensity of these crystals, wherein the X-ray diffraction intensity of each crystal is the intensity of a main peak converted from each X-ray diffraction intensity of a (102) plane of cordierite, a (110) plane of mullite, a (104) plane of corundum and a (220) plane of spinel;

said porous cell walls having a true density of 2.55-2.70 g/cm$^3$, a mean pore diameter of 10-20 μm, and a porosity of 50-65%;

the volume of pores having diameters exceeding 50 μm being 8-25% of the total pore volume;

the volume of pores having diameters of less than 10 μm being 16-25% of the total pore volume, and the pore diameter distribution deviation σ[=log($D_{20}$)−log($D_{80}$)] being 0.5 or less, wherein $D_{20}$ represents a pore diameter (μm) at a pore volume corresponding to 20% of the total pore volume, and $D_{80}$ similarly represents a pore diameter (μm) at a pore volume corresponding to 80% of the total pore volume, on a curve showing the relation between a pore diameter and a cumulative pore volume obtained by accumulating a pore volume from the maximum pore diameter to a particular pore diameter, and $D_{80}$<$D_{20}$;

comprising the steps of blending 16-40% by mass of a silica source material, 19-40% by mass of an alumina source material, 25-40% by mass of a magnesia source material, and 0-40% by mass of a mullite powder, per their total amount, together with a pore-forming material to prepare a moldable material, extrusion-molding the moldable material to form a molded item, and sintering the molded item;

said silica source material comprising silica powder having a mode diameter of 30-60 μm, and containing 10% or less of particles having particle sizes of 20 μm or less and 10% or less of particles having particle sizes of 100 μm or more, its particle size distribution deviation SD [=log(d80)−log(d20)] being 0.5 or less, wherein d20 represents a particle size (μm) corresponding to a cumulative volume of 20%, and d80 similarly represents a particle size (μm) corresponding to a cumulative volume of 80%, on a curve showing the relation between a particle size and a cumulative particle volume expressed by the volume percentage of particles having a particular particle size or less per the total particle volume, and d20<d80.

DESCRIPTION OF THE BEST MODE OF THE INVENTION

[1] Ceramic Honeycomb Structure

The ceramic honeycomb structure of the present invention has a large number of flow paths defined by porous cell walls, said porous cell walls being composed of cordierite crystals, mullite crystals, corundum crystals and/or spinel crystals; the percentage of the X-ray diffraction intensity of the cordierite crystals being 72% or more and less than 85%, the percentage of the X-ray diffraction intensity of the mullite crystals being 15-25%, and the percentage of the total X-ray diffraction intensity of the corundum crystals and the spinel crystals being 5% or less, per the total X-ray diffraction intensity of these crystals, wherein the X-ray diffraction intensity of each crystal is the intensity of a main peak converted from each X-ray diffraction intensity of a (102) plane of cordierite, a (110) plane of mullite, a (104) plane of corundum and a (220) plane of spinel; said porous cell walls having a true density of 2.55-2.70 g/cm$^3$, a mean pore diameter of 10-20 μm, and a porosity of 50-65%, the volume of pores having diameters exceeding 50 μm being 8-25% of the total pore volume, the volume of pores having diameters of less than 10 μm being 16-25% of the total pore volume, and the pore diameter distribution deviation σ being 0.5 or less.

Figure 3:
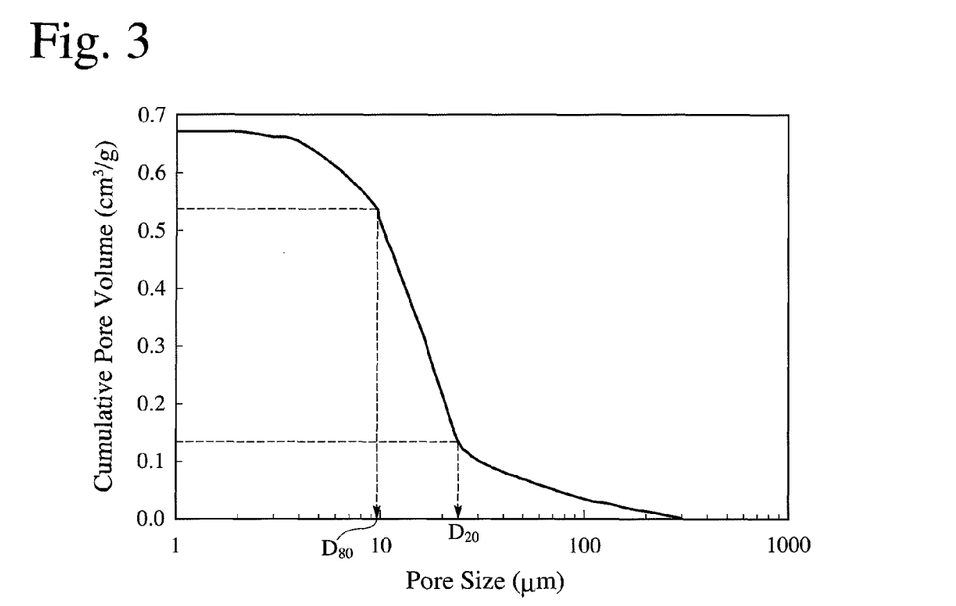
FIG. 3 is a graph showing the relation between a pore diameter and a cumulative pore volume in the porous cell walls.

The pore diameter distribution deviation σ is expressed by the following formula:

$$\sigma = \log(D_{20}) - \log(D_{80}),$$

wherein as shown in FIG. 3, $D_{20}$ represents a pore diameter (μm) at a pore volume corresponding to 20% of the total pore volume, and $D_{80}$ similarly represents a pore diameter (μm) at a pore volume corresponding to 80% of the total pore volume, on a curve showing the relation between a pore diameter and a cumulative pore volume obtained by accumulating a pore volume from the maximum pore diameter to a particular pore diameter, and $D_{80} < D_{20}$. The relation between said pore diameter and the cumulative pore volume can be measured by a mercury intrusion porosimetry method. It is preferably measured by a mercury porosimeter.

Because the crystals of mullite, corundum and spinel are precipitated in cordierite in the porous cell walls as described above, the porous cell walls have a true density of 2.55-2.70 g/cm³, with large thermal capacity, and improved heat resistance because of the presence of mullite, corundum and spinel. Further, having the mean pore diameter, the porosity and the pore diameter in the above ranges, the porous cell walls contain many pores having particular sizes, with few percentages of pores exceeding 50 μm, resulting in improved heat resistance, and providing ceramic honeycomb filters with low pressure loss, good capturing efficiency and high strength.

(1) Crystal Phase

The porous cell walls of the ceramic honeycomb structure of the present invention are composed of cordierite crystals, mullite crystals, corundum crystals and/or spinel crystals; the percentage of the X-ray diffraction intensity of the cordierite crystals being 72% or more and less than 85%, the percentage of the X-ray diffraction intensity of the mullite crystals being 15-25%, and the percentage of the total X-ray diffraction intensity of the corundum crystals and the spinel crystals being 5% or less, per the total X-ray diffraction intensity of these crystals.

The X-ray diffraction intensity of each crystal of cordierite, mullite, corundum and spinel in the porous cell walls is the intensity (main peak intensity) of the highest-intensity diffraction peak of each crystal converted from the X-ray diffraction intensity $I_{cordierite\ (102)}$ of a (102) plane of cordierite, the X-ray diffraction intensity $I_{mullite\ (110)}$ of a (110) plane of mullite, the X-ray diffraction intensity $I_{corundum\ (104)}$ of a (104) plane of corundum, and the X-ray diffraction intensity $I_{spinel\ (220)}$ of a (220) plane of spinel. Conversion to the main peak intensity [each X-ray diffraction intensity of a (500) plane of cordierite, a (210) plane of mullite, a (113) plane of corundum and a (311) plane of spinel] is carried out by the following formulae, using the intensity ratio to the main peak intensity of each crystal described in JCPDS cards; 50% for the (102) plane of cordierite, 50% for the (110) plane of mullite, 40% for the (104) plane of corundum, and 40% for the (220) plane of spinel.

X-ray diffraction intensity of cordierite=
$(I_{cordierite(102)}/50) \times 100$      (1), X-ray diffraction intensity of mullite=$(I_{mullite(110)}/50) \times 100$      (2), X-ray diffraction intensity of corundum=
$(I_{corundum(104)}/40) \times 100$      (3), and X-ray diffraction intensity of spinel=$(I_{spinel(220)}/40) \times 100$      (4).

With this conversion, the problem of overlapped main peaks of these crystals hindering precise determination of their intensities can be avoided, enabling more accurate comparison of the crystal contents.

The percentage of the X-ray diffraction intensity of each crystal of cordierite, mullite, corundum and spinel is determined by dividing the X-ray diffraction intensity of each crystal by their total intensity. For instance, the percentage of the X-ray diffraction intensity of mullite is determined by the formula:

$(I_{mullite(110)}/50) \times 100 / [(I_{cordierite(102)}/50) \times 100 + (I_{mullite(110)}/50) \times 100 + (I_{corundum(104)}/40) \times 100 + (I_{spinel(220)}/40) \times 100].$ When the percentage of the X-ray diffraction intensity of the cordierite crystals is less than 72%, the porous cell walls have a large thermal expansion coefficient and low heat shock resistance. On the other hand, when it is 85% or more, the porous cell walls have low heat resistance, making their melting likely during filter regeneration. The percentage of said cordierite is preferably 75-83%.

When the percentage of the X-ray diffraction intensity of mullite crystals is less than 15%, the porous cell walls have low heat resistance, making their melting likely during filter regeneration. Further, because of the reduced amount of the precipitated mullite, the porous cell walls do not have high strength. On the other hand, when it exceeds 25%, the porous cell walls have an increased thermal expansion coefficient and lowered heat shock resistance. The percentage of said mullite is preferably 17-23%.

When the total X-ray diffraction intensity of corundum crystals and spinel crystals exceeds 5%, the porous cell walls have an increased thermal expansion coefficient and lowered heat shock resistance. The total percentage of the above X-ray diffraction intensities is preferably 3% or less.

(2) Mean Pore Diameter

The porous cell walls have a mean pore diameter in a range of 10-20 μm. The mean pore diameter of less than 10 μm an provides large pressure loss, failing to lower the pressure loss. On the other hand, when it exceeds 20 μm, the porous cell walls have reduced strength. The mean pore diameter is preferably 11-19 μm, more preferably 12-18 μm.

(3) Porosity

The porous cell walls have porosity in a range of 50-65%. The porosity of less than 50% provides large pressure loss, failing to lower the pressure loss. On the other hand, when it exceeds 65%, the porous cell walls suffer reduced thermal capacity, easy melting, reduced capturing efficiency and reduced strength. The porosity of the porous cell walls is preferably 51-64%, more preferably 52-63%.

(4) Pore Structure

In the porous cell walls, the volume of pores having diameters exceeding 50 μm is 8-25% of the total pore volume, the volume of pores having diameters of less than 10 μm is 16-25% of the total pore volume, and the pore diameter distribution deviation σ is 0.5 or less.

When the volume of pores having diameters exceeding 50 μm is less than 8%, the porous cell walls have poor pressure loss characteristics, and when it exceeds 25%, the percentage of strength-decreasing, coarse pores increases, resulting in reduced strength. The volume of pores having diameters exceeding 50 μm is preferably 9-24%, more preferably 10-23%.

Pores having pore diameters of less than 10 μm ensure the permeability of larger pores, improving the pressure loss characteristics. When the volume of pores having diameters of less than 10 μm is less than 16%, the pores do not have sufficient permeability, resulting in large pressure loss. When it exceeds 25%, the porous cell walls have a relatively small percentage of pores having diameters exceeding 10 μm though having permeability, resulting in larger pressure loss. The volume of pores having diameters of less than 10 μm is preferably 17-24%.

When the pores of the cell walls have the above porosity, mean pore diameter and pore diameter distribution, as well as a pore diameter distribution deviation σ [defined by σ=log($D_{20}$)−log($D_{80}$) as described above] of 0.50 or less, the cell walls have a large percentage of pores having diameters of 10-20 μm, resulting in a relatively sharp pore diameter distribution. The cell walls with such pore structure have low pressure loss and high strength. When the pore diameter distribution deviation σ exceeds 0.50, there are more pores adversely affecting the pressure loss and strength, failing to obtain ceramic honeycomb filters having both high strength and low pressure loss. The pore diameter distribution deviation σ is preferably 0.45 or less, more preferably 0.40 or less.

(5) Thermal Expansion Coefficient

The ceramic honeycomb structure preferably has a thermal expansion coefficient of $20 \times 10^{-7}$ or less between 20° C. and 800° C. The ceramic honeycomb structure having a thermal expansion coefficient within the above range has high heat shock resistance. When the thermal expansion coefficient exceeds $20 \times 10^{-7}$, the heat shock resistance undesirably decreases. The thermal expansion coefficient is preferably $10 \times 10^{-7}$ to $18 \times 10^{-7}$.

(6) Thermal Conductivity

The ceramic honeycomb structure preferably has a thermal conductivity of 0.17 W/mK or more. With the thermal conductivity within the above range, the porous cell walls have good thermal conduction, improved heat resistance, and resistance to melting during filter regeneration. When the thermal conductivity is less than 0.17 W/mK, the porous cell walls have low heat resistance, vulnerable to melting during filter regeneration. The thermal conductivity is preferably 0.25 W/mK or more.

(7) Melt-Down Resistance

After a sample (60 mm×40 mm× cell wall thickness) cut out of said ceramic honeycomb structure along the cell walls is kept at 1650° C. for 30 seconds, 75% or more by area of the sample preferably remains without melting. When the area ratio of a portion remaining without melting after the above test is 75% or more, the ceramic honeycomb structure has good heat resistance, providing ceramic honeycomb filters with low pressure loss good capturing efficiency and high strength. The area ratio of a portion remaining without melting by the above test is preferably 80% or more.

The above test will be explained in detail below. A cell wall sample cut out of the ceramic honeycomb structure to have a size of 60 mm in a flow path direction, 40 mm in a direction perpendicular to the flow path direction and a one-cell-wall thickness is kept at 1650° C. for 30 seconds in a furnace, and taken out of the furnace to determine the projected area of a portion remaining without melting by an image analyzer, and the percentage (%) of the projected area of the remaining portion per the projected area (60×40=2400 mm²) of the sample is calculated.

[2] Production Method

The ceramic honeycomb structure of the present invention is produced by blending a silica source material, an alumina source material, a magnesia source material, and if necessary, a mullite powder, a pore-forming material, etc. to prepare a moldable material, extrusion-molding the moldable material to form a molded item, and sintering the molded item.

To obtain a ceramic honeycomb structure containing cordierite crystals, mullite crystals, corundum crystals and/or spinel crystals, 16-40% by mass of a silica source material, 19-40% by mass of an alumina source material, 25-40% by mass of a magnesia source material, and 0-40% by mass of mullite powder, per their total amount, are mixed to have a main component composition comprising 41-47% by mass of $SiO_2$, 42-51% by mass of $Al_2O_3$ and 7-11% by mass of MgO. This starting material powder mixture is called a cordierite/mullite-forming material. Preferable as the silica source material are silica powder, as well as kaolin powder (uncalcined kaolin), calcined kaolin powder, etc. Preferable as the alumina source material are alumina, aluminum hydroxide, etc. Preferable as the magnesia source material is talc.

Though not indispensable, the mullite powder may be added in a range of 0-40% by mass to adjust the percentage of mullite crystals in the crystal phase. The addition of the mullite powder prevents cracking during sintering. The mullite powder preferably has an average particle size of 5-30 μm. When no mullite powder is added, 30-40% by mass of the silica source material, 30-40% by mass of the alumina source material, and 25-40% by mass of the magnesia source material are preferably mixed.

The molded item is sintered, for instance, by heating it to the highest temperature of 1380-1435° C. at a speed of 2-100° C./hour, keeping it at the highest temperature for 5-30 hours, and then cooling it to 1000° C. at a speed of less than 100° C./hour.

Said silica source material preferably contains 10-20% by mass of silica powder per the total amount of the cordierite/mullite-forming materials. Said silica powder preferably has a mode diameter of 30-60 μm, and contains 10% or less of particles having particle sizes of 20 μm or less and 10% or less of particles having particle sizes of 100 μm or more, its particle size distribution deviation SD[=log(d80)−log(d20)] being 0.5 or less, wherein d20 represents a particle size (μm) corresponding to a cumulative volume of 20%, and d80 similarly represents a particle size (μm) corresponding to a cumulative volume of 80%, on a curve showing the relation between a particle size and a cumulative particle volume expressed by the volume percentage of particles having a particular particle size or less per the total particle volume, and d20<d80.

The addition of 10-20% by mass of silica powder to the cordierite/mullite-forming materials provides the preferred pore structure. When the amount of silica exceeds 20% by mass, the amounts of kaolin, talc, etc., other silica source materials, should be reduced to keep the percentages of cordierite crystals and mullite crystals in the crystal phase within the range defined by the present invention. Accordingly, extrusion molding does not provide a sufficiently low thermal expansion coefficient in an orientation direction, resulting in low heat shock resistance. When the silica powder is less than 10% by mass, there are few pores, resulting in poor pressure loss characteristics. The silica powder is preferably 12-18% by mass.

Figure 5:
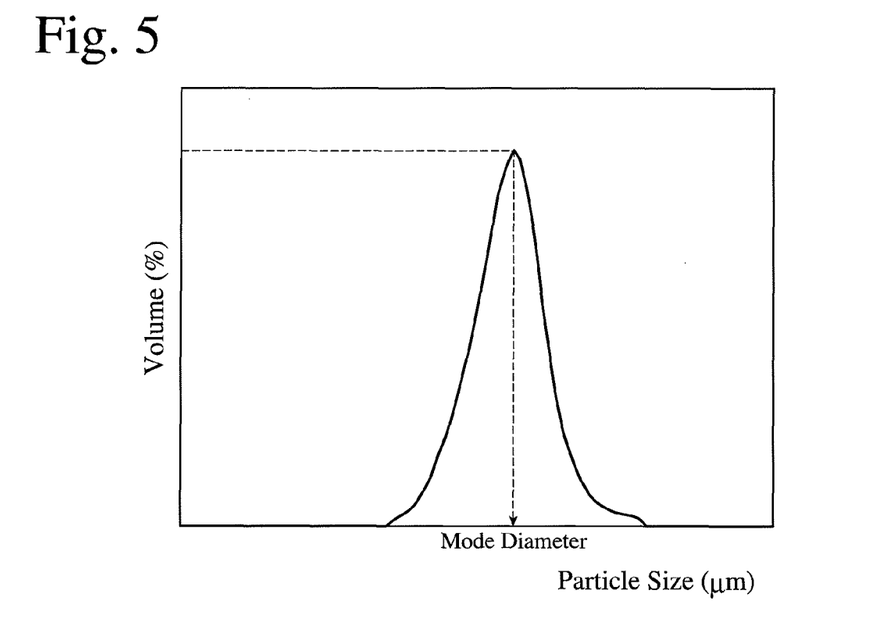
FIG. 5 is a graph schematically showing a particle size distribution of particles.

The silica powder having a mode diameter of less than 30 μm increases the percentage of fine pores deteriorating the pressure loss characteristics. On the other hand, when the mode diameter of the silica powder exceeds 60 μm, the percentage of strength-decreasing, coarse pores undesirably increases. The mode diameter of the silica powder is preferably 35-55 μm. The mode diameter is, as shown in FIG. 5, a particle size having the maximum volume in a volume-based particle size distribution.

The use of silica powder, in which particles having particle sizes of 20 μm or less are more than 10% by mass, increases fine pores deteriorating the pressure loss characteristics, providing ceramic honeycomb filters with poor pressure loss characteristics. To avoid the deterioration of the pressure loss characteristics, it is necessary to keep permeable pores. To this end, it is preferable to use silica powder in which particles having particle sizes of 20 μm or less are 2% by mass or more. More preferably, the silica powder is 3-9% by mass.

The use of silica powder, in which particles having particle sizes of 100 μm or more are more than 10% by mass, increases coarse pores, providing the ceramic honeycomb structure with low strength. The particles having particle sizes of 100 μm or more are preferably 8% by mass or less.

When the silica particles have a mode diameter of 30-60 μm, with 10% by mass or less of particles having particle sizes of 20 μm or less, 10% by mass or less of particles having particle sizes of 100 μm or more, and the particle size distribution deviation SD being 0.5 or less, a sharp pore diameter distribution is obtained, resulting in reduced pressure loss and a lowered percentage of strength-decreasing pores.

Figure 4:
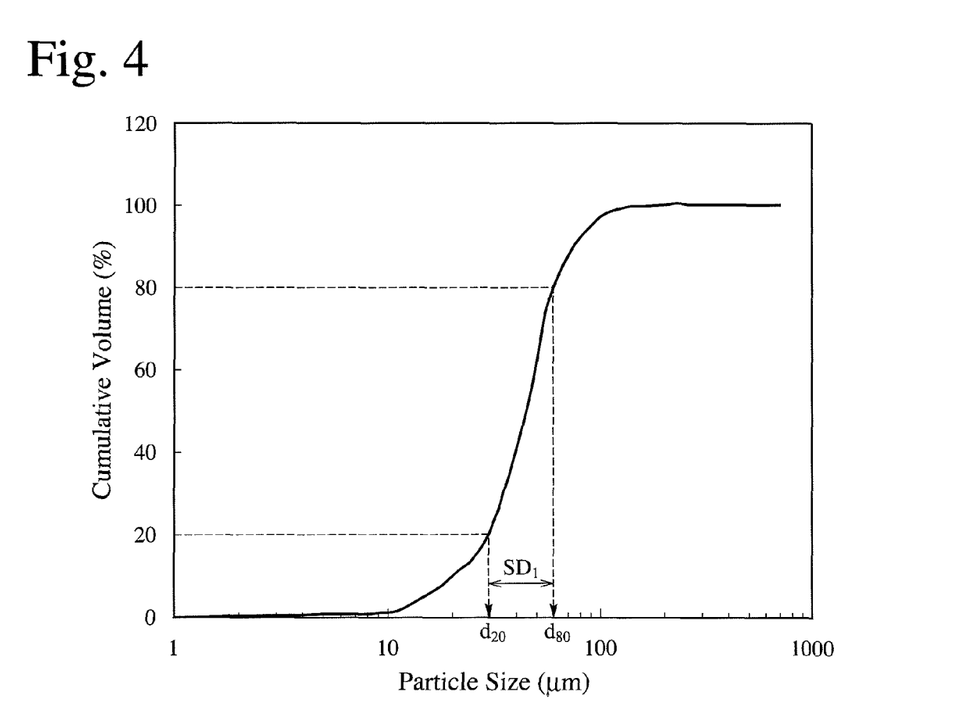
FIG. 4 is a graph showing one example of particle size distributions of silica powder.

The particle size distribution deviation SD is expressed by the following formula:

$$SD = \log(d80) - \log(d20),$$

wherein as shown in FIG. 4, d20 represents a particle size (μm) corresponding to a cumulative volume of 20%, and d80 similarly represents a particle size (μm) corresponding to a cumulative volume of 80%, on a curve (cumulative particle size distribution curve) showing the relation between a particle size and a cumulative particle volume expressed by the volume percentage of particles having a particular particle size or less per the total particle volume, and d20<d80. The particle sizes can be measured by a particle size distribution meter (Microtrack MT3000).

With the particle size distribution deviation SD exceeding 0.5, silica particles have a broad particle size distribution, resulting in a broad pore diameter distribution. As a result, the percentage of pores deteriorating the pressure loss characteristics and strength increases, making it difficult to obtain low pressure loss and high strength. The particle size distribution deviation SD is preferably 0.4 or less, more preferably 0.3 or less. Silica particles with the above particle size distribution can be obtained by classification, mixing of plural silica particles having arbitrary particle sizes, or optimized pulverization.

Silica particles may be crystalline or amorphous, but amorphous silica particles are preferable for controlling the particle size distribution. Amorphous silica can be obtained by melting high-purity natural silica stones at high temperatures and pulverizing the resultant ingot. Though silica particles may contain $Na_2O$, $K_2O$, CaO, etc. as impurities, the total amount of the above impurities is preferably 0.1% by mass or less to avoid a large thermal expansion coefficient.

The silica particles preferably have sphericity of 0.5 or more. The sphericity of less than 0.5 increases the percentage of fine pores deteriorating the pressure loss characteristics, and coarse pores lowering strength. The sphericity is preferably 0.6 or more, more preferably 0.7 or more. The sphericity of silica particles is determined by measuring the area of each projected image of 20 particles by the image analysis of an electron photomicrograph, determining the area of each circle whose diameter is the maximum length between two points on the periphery, which a straight line passing its center of gravity crosses, and calculating an area ratio of each projected image to each circle, and averaging the area ratios.

Figure 6:
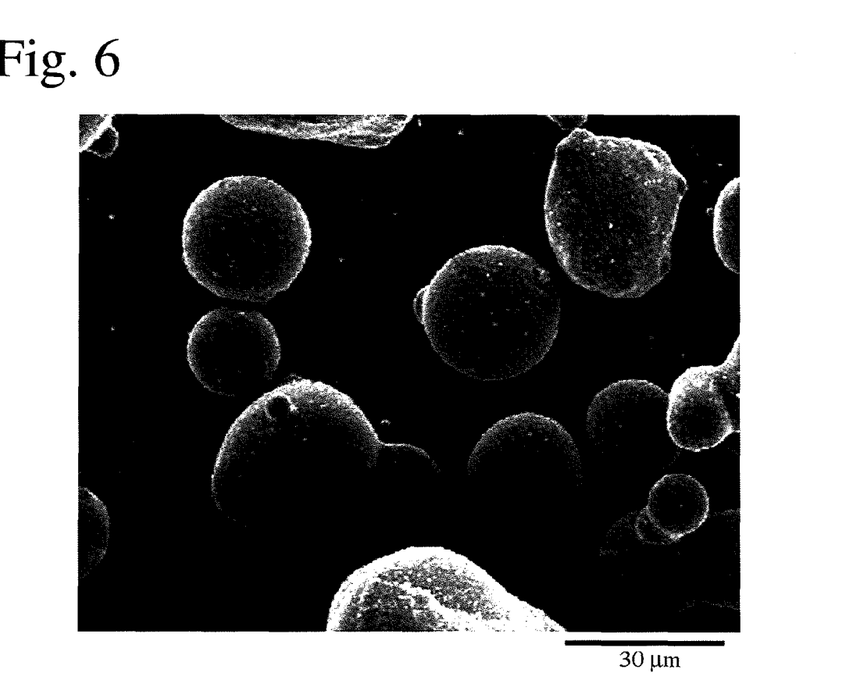
FIG. 6 is a SEM photograph showing one example of amorphous silica powders.

High-sphericity silica particles are, for instance, spherical amorphous silica as shown in FIG. 6. Such spherical silica particles can be obtained by spraying finely pulverized high-purity natural silica stones into a high-temperature flame, to melt and spheroidize particles simultaneously. The particle sizes of spherical silica particles are preferably adjusted by classification, etc.

The silica source material preferably contains uncalcined or calcined kaolin in addition to silica powder. The uncalcined or calcined kaolin is preferably 1-25% by mass of the cordierite/mullite-forming materials. Particularly when no mullite powder is added, the uncalcined or calcined kaolin is preferably 15-25% by mass.

The pore-forming material is added preferably in an amount of 5-10% by mass per the cordierite/mullite-forming materials. The pore-forming material is burned out before cordierite and mullite are synthesized in the sintering process, leaving pores. When the pore-forming material is less than 5% by mass, sufficient pores are not obtained by the pore-forming material, resulting in poor pressure loss characteristics. On the other hand, more than 10% by mass of the pore-forming material provides excessive pores, failing to have sufficient strength. The pore-forming material is preferably 6-9% by mass.

The pore-forming materials include foaming resins such as polyethylene, polyethylene terephthalate, acrylic microcapsules, etc. Among them, foaming resins made of methylmethacrylate-acrylonitrile copolymers are preferable. The foaming resins may be before or after foaming, but the foamed resins are preferable.

The present invention will be explained in more detail referring to Examples below without intention of restricting the present invention thereto.

Examples 1-10 and Comparative Examples 1-7

Silica powder, kaolin powder, talc powder, alumina powder, aluminum hydroxide powder and mullite powder each having the particle size (and particle size distribution) shown in Table 1 were mixed in the amounts shown in Table 1, to prepare cordierite/mullite-forming material powders. The kaolin was calcined kaolin in Examples 1-10 and Comparative Examples 2 and 3, and uncalcined kaolin in other Comparative Examples. With a pore-forming material (foamed resin) in the amount shown in Table 1 and 8% by mass of methylcellulose added to 100% by mass of the starting material powders, blending was conducted together with water to prepare a plasticized moldable ceramic material. Using an extrusion die, each moldable material was extrusion-molded to form a honeycomb-structure molding, dried and removed of a peripheral portion to obtain a molded item. As sintering, these moldings were heated to the highest temperature of 1410° C. at a speed of 20° C./hour, kept at the highest temperature for 24 hours, and then cooled to 1000° C. at a speed of less than 50° C./hour. the sintering time was 200 hours in total. A periphery of each sintered ceramic honeycomb was coated with a skin material comprising amorphous silica and colloidal silica, and dried to obtain each ceramic honeycomb structure having an outer diameter of 266.7 mm, a length of 304.8 mm, a cell pitch of 40/cm², and a cell wall thickness of 0.30 mm.

In each Example, the particle size of silica powder and the amount of the pore-forming material were adjusted to obtain the porosity, mean pore diameter and pore diameter distribution of porous cell walls shown in Table 2. The percentages of silica powders having particle sizes of 20 μm or less and those having particle sizes of 100 μm or more were determined from particle size distributions measured by a particle size distribution meter (Microtrack MT3000). The sphericity of silica particles is expressed by the averaged value of A/B, wherein A represents the projected area of each of 20 silica particles determined from their images on an electron photomicrograph by an image analyzer, and B represents the area of a circle whose diameter was the maximum length between two points on the periphery, which a straight line passing its center of gravity crossed.

As shown in FIGS. 1 and 2, the flow path ends of each ceramic honeycomb structure were alternately plugged with a cordierite-forming material slurry in a checkerboard pattern, dried, and sintered to obtain each ceramic honeycomb filter. The length of plugs in the flow paths was adjusted to 7-10 mm.

Each ceramic honeycomb filter was evaluated with respect to a pore structure, a true density, the X-ray diffraction intensity ratio of each crystal of cordierite, mullite, corundum and spinel, a thermal expansion coefficient (CTE), thermal conductivity, heat resistance, soot-capturing pressure loss and efficiency, and isostatic strength. The results are shown in Table 2.

The pore structure (total pore volume, porosity, mean pore diameter, the volume of pores having diameters of less than 10 μm, the volume of pores having diameters exceeding 50 μm, and pore diameter distribution deviation) was determined from a pore diameter distribution measured by a mercury intrusion porosimetry method. A test piece (10 mm×10 mm×10 mm) cut out of each ceramic honeycomb filter was set in a measurement cell of Autopore III available from Micromeritics, and pressurized by mercury introduced into the cell after evacuation. The relation between a pore diameter and a cumulative pore volume was determined from the relation between pressure and the volume of mercury intruded into pores in the test piece. The mercury-intruding pressure was 0.6 psi ($0.42×10^{-3}$ $kgf/mm^2$), and constants used for calculating the pore diameter from the pressure were a contact angle of 130°, and a surface tension of 484 dyne/cm. The porosity was calculated from the measured total pore volume and the true density measured by a method described later.

The true density was calculated from the volume of a solid portion of the sample measured by said mercury intrusion porosimetry method and the weight of the sample before measurement.

The percentage of the X-ray diffraction intensity of each crystal of cordierite, mullite, corundum and spinel was determined by measuring the X-ray diffraction pattern of a powdery sample produced by pulverizing the ceramic honeycomb filter at 2θ=8-40° using an X-ray diffractometer (Cu—Kα) available from Rigaku Corporation, converting the diffraction intensity $I_{cordierite(102)}$ of a (102) plane of cordierite, the diffraction intensity $I_{mullite(110)}$ of a (110) plane of mullite, the diffraction intensity $I_{corundum(104)}$ of a (104) plane of corundum, and the diffraction intensity $I_{spinel(220)}$ of a (220) plane of spinel to the main peak intensity of each crystal, and calculating the percentage of the main peak intensity of each crystal per the total main peak intensity of all crystals. Conversion to the main peak intensity of each crystal was carried out using the intensity ratios to the main peak described in JCPDS cards; 50% for the (102) plane of cordierite, 50% for the (110) plane of mullite, 40% for the (104) plane of corundum, and 40% for the (220) plane of spinel.

The thermal expansion coefficient (CTE) was determined by cutting the ceramic honeycomb structure to form a test piece having a cross section of 4.5 mm×4.5 mm and a length of 50 mm with its longitudinal direction substantially aligned with the flow path direction, heating the test piece from room temperature to 800° C. at a temperature elevation speed of 10° C./min under a constant load of 20 g to measure the increment of the longitudinal length of the test piece using a thermomechanical analyzer TMA (ThermoPlus available from Rigaku Corporation, compression load type/differential dilatometry type), and calculating an average thermal expansion coefficient between 20° C. and 800° C. therefrom.

The thermal conductivity of the ceramic honeycomb structure was measured by a laser flash method according to JIS R1611.

The heat resistance of the ceramic honeycomb structure was evaluated by melt-down resistance. A cell wall sample cut out of the ceramic honeycomb structure along the cell wall, which was 60 mm in a flow path direction, 40 mm in a direction perpendicular to the flow path direction, and as thick as one cell wall, was kept at 1650° C. for 30 seconds in a furnace, taken out of the furnace to measure the projected area of a portion remaining without melting by an image analyzer, and calculating the percentage (%) of the projected area of the remaining portion to the projected area (60×40=2400 $mm^2$) of the sample before heating. Evaluation was conducted according to the following standard:

Poor: When the area ratio of the remaining portion was less than 75%,
Good: When it was 75% or more and less than 85%, and
Excellent: When it was 85% or more.

The soot-capturing pressure loss was determined by supplying 3 g/h of carbon powder having a particle size of 0.042 μm with an air flow rate of 10 $Nm^3$/min to a ceramic honeycomb filter fixed to a pressure loss test stand, and measuring the pressure difference between the inlet and the outlet (pressure loss) when 2 g of soot was accumulated per 1 liter of the filter. Evaluation was conducted according to the following standard:

Poor: When the pressure loss was more than 1.5 kPa,
Good When it was more than 1.2 kPa and 1.5 kPa or less, and
Excellent When it was 1.2 kPa or less.

The capturing efficiency was determined by supplying 3 g/h of carbon powder having a particle size of 0.042 μm with an air flow rate of 10 $Nm^3$/min to a ceramic honeycomb filter fixed to a pressure loss test stand similarly to the above, and counting the number of carbon particles flowing into the honeycomb filter and the number of carbon particles flowing out of the honeycomb filter every one minute by a scanning mobility particle sizer (SMPS), Model 3936 available from TSI, and calculating the formula of (Nin−Nout)/Nin, wherein Nin represents the number of carbon particles flowing into the honeycomb filter, and Nout represents the number of carbon particles flowing out of the honeycomb filter, in a period from 20 minutes to 21 minutes after the start of supplying carbon powder. The capturing efficiency was evaluated according to the following standard:

Excellent: When the value of the above formula was 98% or more,
Good: When it was 95% or more and less than 98%, and
Poor: When it was less than 95%.

The isostatic strength test was carried out according to JASO standards M505-87 of the Society of Automotive Engineers of Japan. Water was introduced into a pressure vessel, in which a ceramic honeycomb structure having both longitudinal end surfaces sealed with 20-mm-thick aluminum plates and an outer wall coated with a 2-mm-thick rubber was placed, to apply hydrostatic pressure to its outer wall, and the pressure at which the ceramic honeycomb structure was collapsed was measured and used as the isostatic strength. The isostatic strength was evaluated according to the following standard:

Excellent: Not damaged at pressure of 2.0 MPa,
Good: Damaged at pressure of 1.0 MPa or more and less than 2.0 MPa, and
Poor: Damaged at pressure of less than 1.0 MPa.

TABLE 1

| | Silica | | | | | | |
|---|---|---|---|---|---|---|---|
| | M50[1] | Percentage (%) | | SD[2] | | Amount[3] | Impurities[4] |
| No. | (μm) | ≦20 μm | ≧100 μm | [log(μm)] | Sphericity | (% by mass) | (% by mass) |
| Example 1 | 45 | 9.5 | 3.0 | 0.45 | 0.5 | 13.5 | 0.005 |
| Example 2 | 45 | 9.5 | 3.0 | 0.39 | 0.6 | 13.4 | 0.005 |
| Example 3 | 45 | 9.5 | 3.0 | 0.30 | 0.7 | 13.5 | 0.005 |
| Example 4 | 45 | 9.5 | 3.0 | 0.40 | 0.6 | 13.3 | 0.005 |
| Example 5 | 45 | 9.5 | 3.0 | 0.39 | 0.6 | 13.5 | 0.005 |
| Example 6 | 45 | 9.5 | 3.0 | 0.39 | 0.6 | 14.4 | 0.005 |
| Example 7 | 45 | 9.5 | 3.0 | 0.39 | 0.6 | 13.2 | 0.005 |
| Example 8 | 45 | 9.5 | 3.0 | 0.30 | 0.7 | 13.2 | 0.005 |
| Example 9 | 45 | 9.5 | 3.0 | 0.39 | 0.6 | 15.6 | 0.005 |
| Example 10 | 45 | 9.5 | 3.0 | 0.30 | 0.7 | 15.6 | 0.005 |
| Comparative Example 1 | 20 | 50.0 | 15.0 | 0.64 | 0.6 | 18.0 | 0.005 |
| Comparative Example 2 | 70 | 15.0 | 20.0 | 0.60 | 0.6 | 17.5 | 0.005 |
| Comparative Example 3 | 40 | 20.0 | 22.0 | 0.70 | 0.1 | 13.5 | 0.005 |
| Comparative Example 4 | 42 | 20.0 | 22.0 | 0.70 | 0.1 | 13.5 | 0.005 |
| Comparative Example 5 | 42 | 20.0 | 22.0 | 0.70 | 0.1 | 13.5 | 0.005 |
| Comparative Example 6 | 22 | 46.0 | 14.0 | 0.64 | 0.5 | 12.7 | 0.005 |
| Comparative Example 7 | 45 | 9.4 | 3.0 | 0.45 | 0.5 | 20.5 | 0.005 |

Note:
[1]Mode diameter.
[2]Particle size distribution deviation.
[3]Percentage per the total amount of silica, kaolin, talc, alumina, aluminum hydroxide and mullite.
[4]The total amount of CaO, Na$_2$O and K$_2$O as impurities.

| | Kaolin[1] | | | Talc | | |
|---|---|---|---|---|---|---|
| No. | Amount[2] (% by mass) | Average Particle size (μm) | Impurities[3] (% by mass) | Amount[2] (% by mass) | Average Particle size (μm) | Impurities[3] (% by mass) |
| Example 1 | 21.3 | 3.0 | 0.32 | 27.5 | 12.0 | 0.50 |
| Example 2 | 21.5 | 3.0 | 0.32 | 27.3 | 10.5 | 0.48 |
| Example 3 | 21.3 | 4.0 | 0.32 | 27.5 | 10.5 | 0.48 |
| Example 4 | 21.4 | 4.0 | 0.32 | 27.4 | 10.5 | 0.48 |
| Example 5 | 21.3 | 4.0 | 0.32 | 27.5 | 10.5 | 0.48 |
| Example 6 | 3.6 | 4.0 | 0.32 | 29.5 | 10.5 | 0.48 |
| Example 7 | 3.3 | 4.0 | 0.32 | 27.0 | 10.5 | 0.48 |
| Example 8 | 3.3 | 4.0 | 0.32 | 27.0 | 10.5 | 0.48 |
| Example 9 | 3.9 | 4.0 | 0.32 | 32.1 | 10.5 | 0.48 |
| Example 10 | 3.9 | 4.0 | 0.32 | 32.1 | 10.5 | 0.48 |
| Comparative Example 1 | 6.0 | 3.0 | 0.32 | 41.0 | 12.0 | 0.50 |
| Comparative Example 2 | 12.5 | 3.0 | 0.32 | 36.5 | 12.0 | 0.50 |
| Comparative Example 3 | 21.3 | 3.0 | 0.32 | 27.5 | 12.0 | 0.50 |
| Comparative Example 4 | 21.3 | 3.0 | 0.32 | 27.5 | 12.0 | 0.50 |
| Comparative Example 5 | 21.3 | 3.0 | 0.32 | 27.5 | 12.0 | 0.50 |
| Comparative Example 6 | 3.2 | 4.0 | 0.32 | 26.1 | 10.5 | 0.48 |
| Comparative Example 7 | 6.0 | 3.0 | 0.32 | 42.0 | 12.0 | 0.50 |

Note:
[1]Calcined kaolin was used in Examples 1-10 and Comparative Examples 2 and 3, and uncalcined kaolin was used in other Comparative Examples.
[2]Percentage per the total amount of silica, kaolin, talc, alumina, aluminum hydroxide and mullite.
[3]The total amount of CaO, Na$_2$O and K$_2$O as impurities.

TABLE 1-continued

| | Alumina | | | Aluminum Hydroxide | | |
|---|---|---|---|---|---|---|
| No. | Amount[1] (% by mass) | Average Particle Size (μm) | Impurities[2] (% by mass) | Amount[1] (% by mass) | Average Particle Size (μm) | Impurities[2] (% by mass) |
| Example 1 | 37.7 | 6.2 | 0.30 | — | — | — |
| Example 2 | 37.8 | 6.2 | 0.30 | — | — | — |
| Example 3 | 37.7 | 6.2 | 0.30 | — | — | — |
| Example 4 | 37.9 | 6.2 | 0.30 | — | — | — |
| Example 5 | 37.7 | 6.2 | 0.30 | — | — | — |
| Example 6 | 22.0 | 6.2 | 0.30 | — | — | — |
| Example 7 | 20.2 | 6.2 | 0.30 | — | — | — |
| Example 8 | 20.2 | 6.2 | 0.30 | — | — | — |
| Example 9 | 24.1 | 6.2 | 0.30 | — | — | — |
| Example 10 | 24.1 | 6.2 | 0.30 | — | — | — |
| Comparative Example 1 | 24.0 | 6.2 | 0.30 | 11.0 | 1.8 | 0.30 |
| Comparative Example 2 | 33.5 | 6.2 | 0.30 | — | — | — |
| Comparative Example 3 | 37.7 | 6.2 | 0.30 | — | — | — |
| Comparative Example 4 | 37.7 | 6.2 | 0.30 | — | — | — |
| Comparative Example 5 | 37.7 | 6.2 | 0.30 | — | — | — |
| Comparative Example 6 | 19.5 | 6.2 | 0.30 | — | — | — |
| Comparative Example 7 | 31.5 | 6.2 | 0.30 | — | — | — |

Note:
[1]Percentage per the total amount of silica, kaolin, talc, alumina, aluminum hydroxide and mullite.
[2]The total amount of CaO, Na$_2$O and K$_2$O as impurities.

| | Mullite | | | Pore-Forming Material | |
|---|---|---|---|---|---|
| No. | Amount[1] (% by mass) | Average Particle size (μm) | Impurities[2] (% by mass) | M50[3] (μm) | Amount[1] (% by mass) |
| Example 1 | — | — | — | 48.0 | 8.5 |
| Example 2 | — | — | — | 48.0 | 8.5 |
| Example 3 | — | — | — | 48.0 | 8.5 |
| Example 4 | — | — | — | 48.0 | 8.5 |
| Example 5 | — | — | — | 45.2 | 8.5 |
| Example 6 | 30.5 | 15.0 | 0.35 | 48.0 | 8.5 |
| Example 7 | 36.3 | 15.0 | 0.35 | 48.0 | 8.5 |
| Example 8 | 36.3 | 15.0 | 0.35 | 48.0 | 8.5 |
| Example 9 | 24.3 | 15.0 | 0.35 | 48.0 | 8.5 |
| Example 10 | 24.3 | 15.0 | 0.35 | 48.0 | 8.5 |
| Comparative Example 1 | — | — | — | 48.0 | 6.5 |
| Comparative Example 2 | — | — | — | 48.0 | 6.5 |
| Comparative Example 3 | — | — | — | 48.0 | 6.5 |
| Comparative Example 4 | — | — | — | 48.0 | 2.5 |
| Comparative Example 5 | — | — | — | 48.0 | 13.0 |
| Comparative Example 6 | 38.5 | 15.0 | 0.35 | 48.0 | 8.5 |
| Comparative Example 7 | — | — | — | 48.0 | 6.5 |

Note:
[1]Percentage per the total amount of silica, kaolin, talc, alumina, aluminum hydroxide and mullite.
[2]The total amount of CaO, Na$_2$O and K$_2$O as impurities.
[3]Mode diameter.

TABLE 2

| No. | Pore Distribution | | | | | |
|---|---|---|---|---|---|---|
| | Total Pore Volume (cm³/g) | Porosity (%) | Average Pore size (μm) | Volume Ratio (%) of Pores | | σ[1] |
| | | | | <10 μm | >50 μm | |
| Example 1 | 0.663 | 63.8 | 15.0 | 18.0 | 13.0 | 0.49 |
| Example 2 | 0.665 | 63.8 | 14.0 | 21.0 | 9.0 | 0.43 |
| Example 3 | 0.670 | 64.0 | 15.5 | 23.0 | 10.0 | 0.39 |
| Example 4 | 0.420 | 52.7 | 15.1 | 17.9 | 14.0 | 0.44 |
| Example 5 | 0.700 | 65.0 | 14.9 | 17.5 | 15.0 | 0.45 |
| Example 6 | 0.676 | 64.1 | 14.5 | 21.5 | 10.0 | 0.44 |
| Example 7 | 0.650 | 63.6 | 14.1 | 20.8 | 8.8 | 0.42 |
| Example 8 | 0.655 | 63.8 | 15.6 | 22.5 | 10.4 | 0.39 |
| Example 9 | 0.701 | 64.6 | 16.0 | 18.5 | 12.0 | 0.43 |
| Example 10 | 0.699 | 64.5 | 16.3 | 17.5 | 10.0 | 0.38 |
| Comparative Example 1 | 0.633 | 61.7 | 19.0 | 12.0 | 27.0 | 0.70 |
| Comparative Example 2 | 0.650 | 62.6 | 25.0 | 15.0 | 7.0 | 0.59 |
| Comparative Example 3 | 0.663 | 63.8 | 18.0 | 28.0 | 29.0 | 0.85 |
| Comparative Example 4 | 0.374 | 49.8 | 17.0 | 35.0 | 26.0 | 0.88 |
| Comparative Example 5 | 0.805 | 68.1 | 23.0 | 27.0 | 31.0 | 0.80 |
| Comparative Example 6 | 0.645 | 63.4 | 20.0 | 11.5 | 26.0 | 0.65 |
| Comparative Example 7 | 0.660 | 62.9 | 16.0 | 17.0 | 15.0 | 0.49 |

Note:
[1]Pore distribution deviation.

| No. | Percentages of Crystals[1] | | | | Filter Characteristics | |
|---|---|---|---|---|---|---|
| | Cordierite (%) | Mullite (%) | Corundum (%) | Spinel (%) | True Density (g/cm³) | CTE[2] (20-800° C.) (×10⁻⁷/° C.) |
| Example 1 | 78.0 | 19.0 | 2.0 | 1.0 | 2.66 | 18.0 |
| Example 2 | 78.1 | 18.9 | 2.0 | 1.0 | 2.65 | 18.0 |
| Example 3 | 78.2 | 18.8 | 2.0 | 1.0 | 2.65 | 18.0 |
| Example 4 | 78.1 | 18.9 | 2.0 | 1.0 | 2.65 | 20.0 |
| Example 5 | 78.2 | 18.8 | 2.0 | 1.0 | 2.65 | 20.0 |
| Example 6 | 78.4 | 19.8 | 1.1 | 0.7 | 2.64 | 17.8 |
| Example 7 | 72.5 | 24.9 | 1.9 | 0.7 | 2.69 | 20.0 |
| Example 8 | 72.3 | 24.8 | 2.0 | 0.9 | 2.69 | 19.0 |
| Example 9 | 84.0 | 15.0 | 0.7 | 0.3 | 2.60 | 18.0 |
| Example 10 | 84.2 | 15.1 | 0.5 | 0.2 | 2.60 | 18.0 |
| Comparative Example 1 | 95.3 | 1.5 | 0.1 | 3.1 | 2.54 | 7.0 |
| Comparative Example 2 | 91.0 | 6.0 | 1.2 | 1.8 | 2.57 | 11.0 |
| Comparative Example 3 | 78.1 | 18.9 | 2.0 | 1.0 | 2.65 | 18.0 |
| Comparative Example 4 | 78.0 | 19.0 | 2.0 | 1.0 | 2.66 | 17.9 |
| Comparative Example 5 | 78.1 | 18.9 | 2.0 | 1.0 | 2.65 | 18.0 |
| Comparative Example 6 | 69.7 | 27.0 | 2.0 | 1.3 | 2.71 | 21.5 |
| Comparative Example 7 | 94.1 | 0.3 | 0.5 | 5.1 | 2.57 | 12.0 |

Note:
[1]The percentage of the X-ray diffraction intensity of each crystal per the total X-ray diffraction intensity.
[2]Thermal expansion coefficient.

Evaluation Results of Filler Characteristics

| No. | Thermal Conductivity (W/mK) | Area Ratio of Remaining Heat-Resistant Portion (%) | | Soot-Capturing Pressure Loss[2] (kPa) | | Capturing Efficiency | | Isostatic Strength (MPa) | |
|---|---|---|---|---|---|---|---|---|---|
| Example 1 | 0.30 | 86.0 | Excellent | 1.4 | Good | 97.0 | Good | 2.3 | Excellent |
| Example 2 | 0.30 | 86.2 | Excellent | 1.3 | Good | 98.2 | Excellent | 2.1 | Excellent |
| Example 3 | 0.30 | 86.1 | Excellent | 1.0 | Excellent | 98.8 | Excellent | 2.0 | Excellent |
| Example 4 | 0.30 | 78.0 | Good | 1.4 | Good | 98.0 | Excellent | 2.0 | Excellent |

TABLE 2-continued

| | | | | | | | | | |
|---|---|---|---|---|---|---|---|---|---|
| Example 5 | 0.30 | 85.9 | Excellent | 1.4 | Good | 96.0 | Good | 3.0 | Excellent |
| Example 6 | 0.28 | 89.9 | Excellent | 1.2 | Excellent | 99.0 | Excellent | 2.0 | Excellent |
| Example 7 | 0.35 | 92.2 | Excellent | 1.3 | Good | 98.1 | Excellent | 2.0 | Excellent |
| Example 8 | 0.36 | 92.0 | Excellent | 0.9 | Excellent | 98.0 | Excellent | 2.0 | Excellent |
| Example 9 | 0.20 | 75.4 | Good | 1.3 | Good | 97.8 | Good | 1.9 | Good |
| Example 10 | 0.21 | 75.6 | Good | 1.2 | Excellent | 97.7 | Good | 2.0 | Excellent |
| Comparative Example 1 | 0.10 | 59.4 | Poor | 2.0 | Poor | 95.5 | Good | 1.1 | Good |
| Comparative Example 2 | 0.10 | 71.1 | Poor | 2.0 | Poor | 96.0 | Good | 1.2 | Good |
| Comparative Example 3 | 0.30 | 85.3 | Excellent | 1.8 | Poor | 95.1 | Good | 0.9 | Poor |
| Comparative Example 4 | 0.29 | 72.3 | Poor | 2.9 | Poor | 98.5 | Excellent | 0.9 | Poor |
| Comparative Example 5 | 0.30 | 85.3 | Excellent | 1.2 | Excellent | 91.0 | Poor | 0.8 | Poor |
| Comparative Example 6 | 0.36 | 92.5 | Excellent | 2.1 | Poor | 96.0 | Good | 1.2 | Good |
| Comparative Example 7 | 0.08 | 55.2 | Poor | 1.5 | Good | 96.0 | Good | 2.1 | Excellent |

Note:
[2] Pressure difference between before and after capturing 2 g/L of soot (pressure loss).

It is clear from Table 2 that the ceramic honeycomb filters of Examples 1-10 within the present invention have good heat resistance, and lower pressure loss while keeping enough strength to withstand use. On the other hand, the ceramic honeycomb filters of Comparative Examples 1-7 do not necessarily meet all of the requirements of heat resistance, pressure loss and strength simultaneously.

Effect of the Invention

Because the ceramic honeycomb structure of the present invention has heat resistance improved while keeping heat shock resistance, as well as low pressure loss, good capturing efficiency and high strength, it is suitable for ceramic honeycomb filters for removing particulate matter from exhaust gases discharged from diesel engines.

What is claimed is:

1. A ceramic honeycomb structure having a large number of flow paths defined by porous cell walls, said porous cell walls being composed of cordierite crystals, mullite crystals, corundum crystals and/or spinel crystals; the percentage of the X-ray diffraction intensity of the cordierite crystals being 72% or more and less than 85%, the percentage of the X-ray diffraction intensity of the mullite crystals being 15-25%, and the percentage of the total X-ray diffraction intensity of the corundum crystals and the spinel crystals being 5% or less, per the total X-ray diffraction intensity of these crystals, wherein the X-ray diffraction intensity of each crystal is the intensity of a main peak converted from each X-ray diffraction intensity of a (102) plane of cordierite, a (110) plane of mullite, a (104) plane of corundum and a (220) plane of spinel;

said porous cell walls having a true density of 2.55-2.70 g/cm$^3$, a mean pore diameter of 10-20 μm, and a porosity of 50-65%;

the volume of pores having diameters exceeding 50 μm being 8-25% of the total pore volume;

the volume of pores having diameters of less than 10 μm being 16-25% of the total pore volume; and the pore diameter distribution deviation σ[=log($D_{20}$)−log ($D_{80}$)] being 0.5 or less, wherein $D_{20}$ represents a pore diameter (μm) at a pore volume corresponding to 20% of the total pore volume, and $D_{80}$ similarly represents a pore diameter (μm) at a pore volume corresponding to 80% of the total pore volume, on a curve showing the relation between a pore diameter and a cumulative pore volume obtained by accumulating a pore volume from the maximum pore diameter to a particular pore diameter, and $D_{80}$<$D_{20}$.

2. The ceramic honeycomb structure according to claim 1, wherein said ceramic honeycomb structure has a thermal expansion coefficient of 20×10$^{-7}$ or less between 20° C. and 800° C.

3. The ceramic honeycomb structure according to claim 1, wherein said ceramic honeycomb structure has a thermal conductivity of 0.17 W/mK or more.

4. The ceramic honeycomb structure according to claim 1, wherein after a sample (60 mm×40 mm× cell wall thickness) cut out of said ceramic honeycomb structure along the cell walls is kept at 1650° C. for 30 seconds, 75% or more by area of the sample remains without melting.

5. A method for producing a ceramic honeycomb structure having a large number of flow paths defined by porous cell walls, said porous cell walls being composed of cordierite crystals, mullite crystals, corundum crystals and/or spinel crystals; the percentage of the X-ray diffraction intensity of the cordierite crystals being 72% or more and less than 85%, the percentage of the X-ray diffraction intensity of the mullite crystals being 15-25%, and the percentage of the total X-ray diffraction intensity of the corundum crystals and the spinel crystals being 5% or less, per the total X-ray diffraction intensity of these crystals, wherein the X-ray diffraction intensity of each crystal is the intensity of a main peak converted from each X-ray diffraction intensity of a (102) plane of cordierite, a (110) plane of mullite, a (104) plane of corundum and a (220) plane of spinel;

said porous cell walls having a true density of 2.55-2.70 g/cm$^3$, a mean pore diameter of 10-20 μm, and a porosity of 50-65%;

the volume of pores having diameters exceeding 50 μm being 8-25% of the total pore volume, the volume of pores having diameters of less than 10 μm being 16-25% of the total pore volume, and the pore diameter distribution deviation σ[=log($D_{20}$)−log ($D_{80}$)] being 0.5 or less, wherein $D_{20}$ represents a pore diameter (μm) at a pore volume corresponding to 20% of the total pore volume, and $D_{80}$ similarly represents a pore diameter (μm) at a pore volume corresponding to 80% of the total pore volume, on a curve showing the relation between a pore diameter and a cumulative pore volume obtained by accumulating a pore volume from the maximum pore diameter to a particular pore diameter, and $D_{80} < D_{20}$;

said method comprising the steps of blending 16-40% by mass of a silica source material, 19-40% by mass of an alumina source material, 25-40% by mass of a magnesia source material, and 0-40% by mass of a mullite powder, per their total amount, together with a pore-forming material to prepare a moldable material, extrusion-molding the moldable material to form a molded item, and sintering the molded item;

said silica source material comprising silica powder having a mode diameter of 30-60 μm, and containing 10% or less of particles having particle sizes of 20 μm or less and 10% or less of particles having particle sizes of 100 μm or more, its particle size distribution deviation SD [=log(d80)−log(d20)] being 0.5 or less, wherein d20 represents a particle size (μm) corresponding to a cumulative volume of 20%, and d80 similarly represents a particle size (μm) corresponding to a cumulative volume of 80%, on a curve showing the relation between a particle size and a cumulative particle volume expressed by the volume percentage of particles having a particular particle size or less per the total particle volume, and d20<d80.

\* \* \* \* \*